US007289057B2

(12) United States Patent
Meil

(10) Patent No.: US 7,289,057 B2
(45) Date of Patent: Oct. 30, 2007

(54) METHOD AND APPARATUS FOR DETECTION OF SIGNAL HAVING RANDOM CHARACTERISTICS

(75) Inventor: Christopher G. Meil, Akron, OH (US)

(73) Assignee: Cisco Technology, Inc., San Jose, CA (US)

( * ) Notice: Subject to any disclaimer, the term of this patent is extended or adjusted under 35 U.S.C. 154(b) by 278 days.

(21) Appl. No.: 11/187,297

(22) Filed: Jul. 22, 2005

(65) Prior Publication Data

US 2007/0018885 A1    Jan. 25, 2007

(51) Int. Cl.
*G01S 13/00* (2006.01)
*H03K 9/00* (2006.01)

(52) U.S. Cl. .......................................... 342/52; 375/316
(58) Field of Classification Search .................. 342/52; 375/316
See application file for complete search history.

(56) References Cited

U.S. PATENT DOCUMENTS 2,750,113 A * 6/1956 Coleman .................... 235/474
3,551,672 A * 12/1970 Homer et al. ............... 250/375
6,675,012 B2    1/2004 Gray
6,697,013 B2    2/2004 McFarland et al.
2004/0181359 A1 * 9/2004 Freger et al. ............... 702/149
2006/0199587 A1 * 9/2006 Hansen ....................... 455/442
2007/0018885 A1 * 1/2007 Meil .......................... 342/159

FOREIGN PATENT DOCUMENTS

GB           2 362 025       11/2001
WO           WO 01/73712     10/2001

OTHER PUBLICATIONS

International Search Report for International Application No. PCT/US2006/025053, filed Jun. 27, 2006.

* cited by examiner

*Primary Examiner*—Thomas H. Tarcza
*Assistant Examiner*—Shelley Chen
(74) *Attorney, Agent, or Firm*—Tucker Ellis & West LLP

(57) ABSTRACT

A method for detecting a signal having random characteristics. A plurality of bursts are detected within a predetermined time period. The plurality of bursts are evaluated to determine how many pulses each of the plurality of bursts contains. The signal having random characteristics is present responsive to the ratio of number of bursts containing a first predetermined number of pulses being approximately equal to number of bursts containing a second predetermined number of pulses. For signals such as a Bin-5 Test Signal, the signal is determined to be present responsive to the number of singletons (bursts having one pulse), the number of pairs (bursts having two pulses) and the number of triplets (bursts having three pulses) being approximately equal.

24 Claims, 4 Drawing Sheets

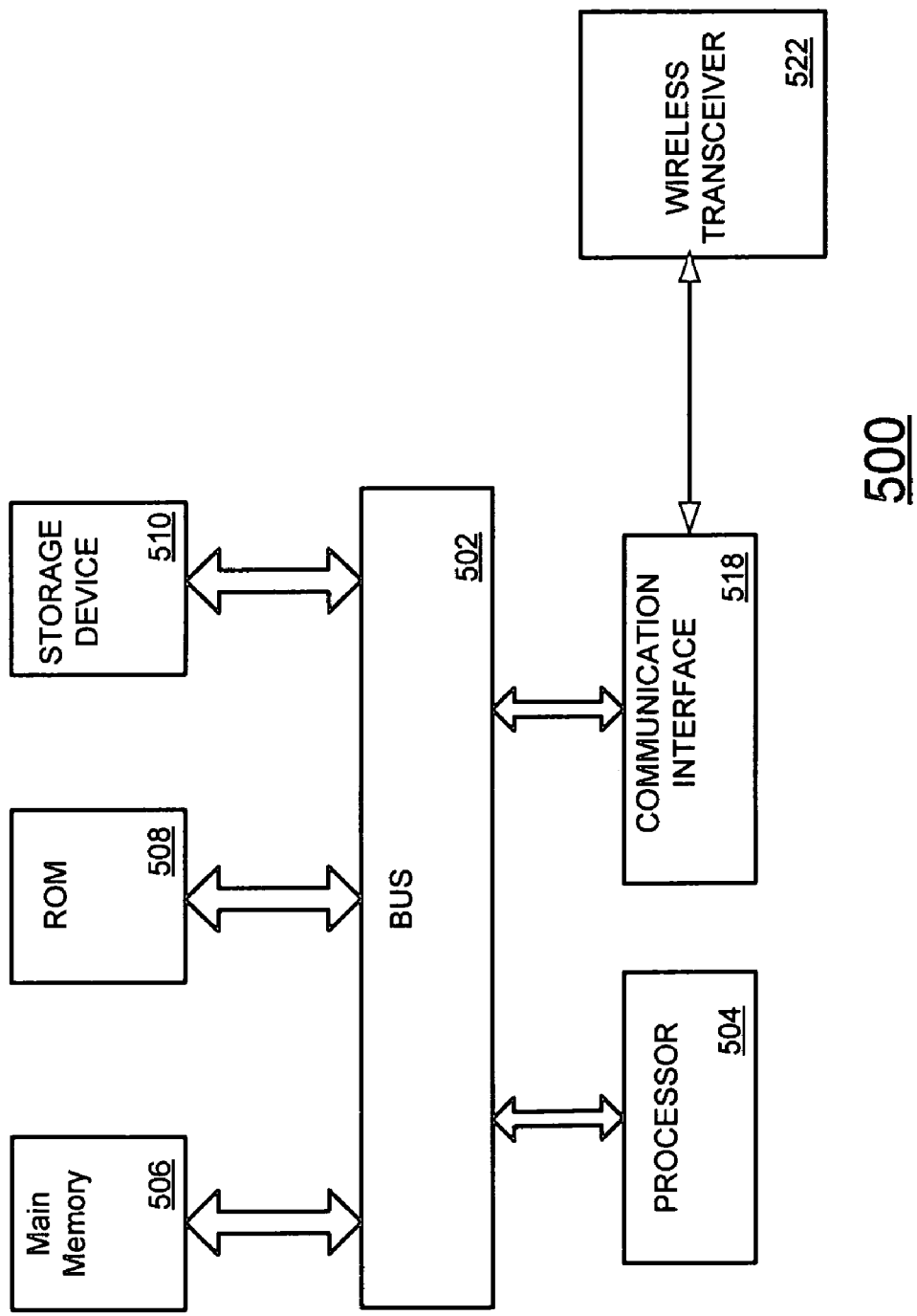

METHOD AND APPARATUS FOR DETECTION OF SIGNAL HAVING RANDOM CHARACTERISTICS

CROSS-REFERENCE TO RELATED APPLICATIONS

This application is related to U.S. application Ser. No. 10/910,682 filed on Aug. 3, 2004 and assigned to Cisco Technology, Inc., a common assignee for this invention.

BACKGROUND OF THE INVENTION

The present invention relates generally to detection of a signal having random characteristics, and more specifically to detection of a signal having a random number of pulses, and other potentially random characteristics such as pulse width, spacing between pulses and a random number of pulses within a random number of bursts, within a predetermined time period.

The Federal Communications Commission (FCC) has published requirements for unlicensed wireless devices that operate in the frequency bands 5.250-5.350 GHz or 5.470-5.725 GHz to employ a mechanism to share these bands with radar operations. These requirements are published in FCC 5 GHz Report and Order, RM-10371.

However, the National Telecommunications and Information Administration (NTIA) has distributed an additional requirement to detect a new test signal, referred to as the "Bin-5 Test Signal" which is being recommended to the FCC for inclusion in the test procedure described in RM-10371. Devices unable to detect the Bin-5 Test Signal may not be certified for operation in the 5.250-5.350 GHz or 5.470-5.725 GHz bands in the United States.

Currently, the transmission period for the Bin-5 Test signal is twelve seconds. The Bin-5 test signal will have a total of 8 to 20 pulse bursts within the twelve second period, with the number of bursts being randomly chosen. Each burst will consist of one to three pulses, with the number of pulses being randomly chosen. Each pulse within a burst will have a linear FM of 5-20 MHz (each pulse within the burst will have the same amount of chirp). Each pulse burst within the twelve second time period may have different chip widths. Each pulse in a burst will have the same randomly chosen length between 50 to 100 microseconds with a minimum resolution of 5 microseconds. If more than one pulse in present in a burst, each space between the pulses will be a randomly chosen time between 1000 and 2000 microseconds (or 1 to 2 milliseconds) with a 1 microsecond minimum resolution. Each burst will be placed at a random starting location.

An example Bin-5 Test Signal is illustrated in FIG. 1. Each burst, 1, 2, 3 . . . N occurs within a corresponding Burst Interval. As illustrated Burst 1 has two pulses, Burst 2 has one pulse, Burst 3 has three pulses, Burst 4 has two pulses . . . and Burst N has one pulse. The pulse widths and spacing between pulses is random.

The Bin-5 Test Signal will not be detected by prior art systems. Thus, there is a need for a method and apparatus that can accurately detect the Bin-5 Test Signal, or test signals having random characteristics similar to the Bin-5 Test Signal. Detecting the Bin-5 Test Signal requires distinguishing it from wireless network traffic. Without being able to distinguish the test signal from network traffic, false detection from network traffic may occur frequently, rendering a detection solution impractical.

BRIEF SUMMARY OF THE INVENTION

An aspect of the present invention uses a concept of examining ratios of single pulse bursts to bursts having two or more pulses to distinguish wireless network transmissions from a Bin-5 Test Signal or any other signal with similar characteristics, thereby suppressing false detection caused by network traffic to a practical level. An aspect of the present invention enables a device to operate in the 5.250-5.350 GHz band or the 5.470-5.725 GHz band in the United States.

An aspect of the present invention is a method for detecting a signal having random characteristics. The method comprises detecting a plurality of bursts within a predetermined time period, evaluating the plurality of bursts to determine how many pulses each of the plurality of bursts contains and determining the signal having random characteristics is present responsive to the ratio the plurality of bursts containing a first predetermined number of pulses being approximately equal to the plurality of bursts containing a second predetermined number of pulses.

Still other objects of the present invention will become readily apparent to those skilled in this art from the following description wherein there is shown and described a preferred embodiment of this invention, simply by way of illustration of one of the best modes best suited for to carry out the invention. As it will be realized, the invention is capable of other different embodiments and its several details are capable of modifications in various obvious aspects all without departing from the invention. Accordingly, the drawing and descriptions will be regarded as illustrative in nature and not as restrictive.

BRIEF DESCRIPTION OF THE SEVERAL VIEWS OF THE DRAWING

The accompanying drawings incorporated in and forming a part of the specification, illustrates several aspects of the present invention, and together with the description serve to explain the principles of the invention.

FIG. 5 is a block diagram that illustrates a computer system upon which an embodiment of the invention may be implemented.

DETAILED DESCRIPTION OF INVENTION

Throughout this description, the preferred embodiment and examples shown should be considered as exemplars, rather than limitations, of the present invention.

Wireless network traffic may result in energy pulses (for example, from collisions of transmitted packets) that are indistinguishable from single pulse Bin-5 Test Signal bursts (with currently available receiver hardware). However, an aspect of the present invention distinguishes wireless network traffic from Bin-5 Test Signal transmissions by analyzing the ratio of bursts that contain one pulse ("singletons") to bursts that contain two pulses ("pairs") to bursts that contain three pulses ("triplets"). For the Bin-5 Test Signal, because the number of pulses in each burst is randomly chosen, the ratio of singletons to pairs to triplets is approximately 1:1:1. By approximately or approximately equal to 1:1:1 is meant the ratio of singletons to pairs to triplets is less than at least 8:4:1, preferably 4:2:1. Although the present invention is described in the context of Bin-5 Test Signal, that is bursts containing singletons, pairs and triplets, the present invention is adaptable for detection of any signal having Bin-5 Test Signal characteristics, e.g., a signal that has bursts containing a random number of pulses distributed over a predetermined time period and can detect signals with random bursts of one, two, or more pulses.

For wireless network traffic, Bin-5 like pulses may occur, and their distribution may statistically result in a pair or triplet of such pulses (e.g., the more Bin-5 like wireless transmissions that occur, the greater the probability that two of them will occur within 1 to 2 milliseconds of each other and also have identical pulse duration, forming a Bin-5 like pair. Less probably still, a Bin-5 like triplet may also occur as a result of many such transmissions). However, because pairs of pulses are created by timing that is less likely than that for a single pulse, and triplets (bursts consisting of three pulses) are created by even less probably timing, the ratio of singletons to pairs to triplets, the ratio of singletons to pairs to triplets is not 1:1:1. As an example, in an IEEE 802.11a network with multiple transmitters, collisions from transmissions typically generate a 100:10:1 ratio of Bin-5 like singletons to Bin-5 like pairs to Bin-5 like triplets. Thus, a ratio less than 100:10:1 (e.g., 8:4:1 or 4:2:1) of singletons to pairs to triplets should be used to detect a Bin-5 Test Signal or signal with similar characteristics. Therefore, by examining the ratio of singletons to pairs to triplets, a determination can be made whether it is more likely that received signals are from wireless network transmissions, or if they are a Bin-5 Test Signal, or from an actual radar, for which the Bin-5 test signal is a characteristic.

Figure 1:
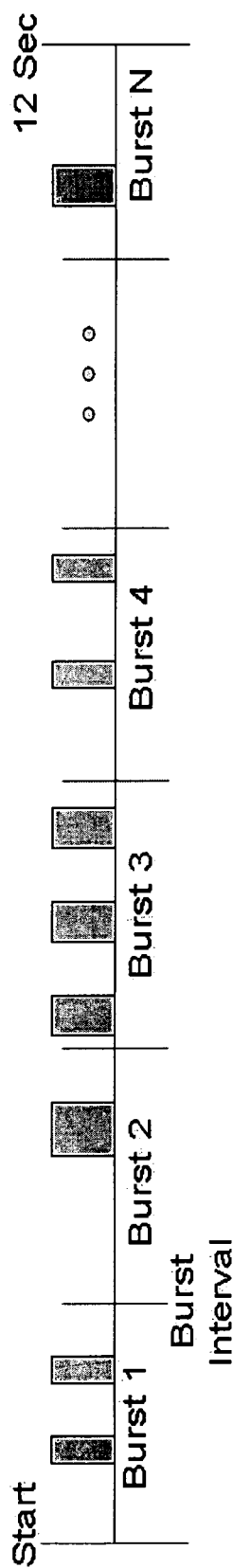
FIG. 1 is a graphical representation of an exemplary Bin 5 Test Signal waveform.
Figure 2:
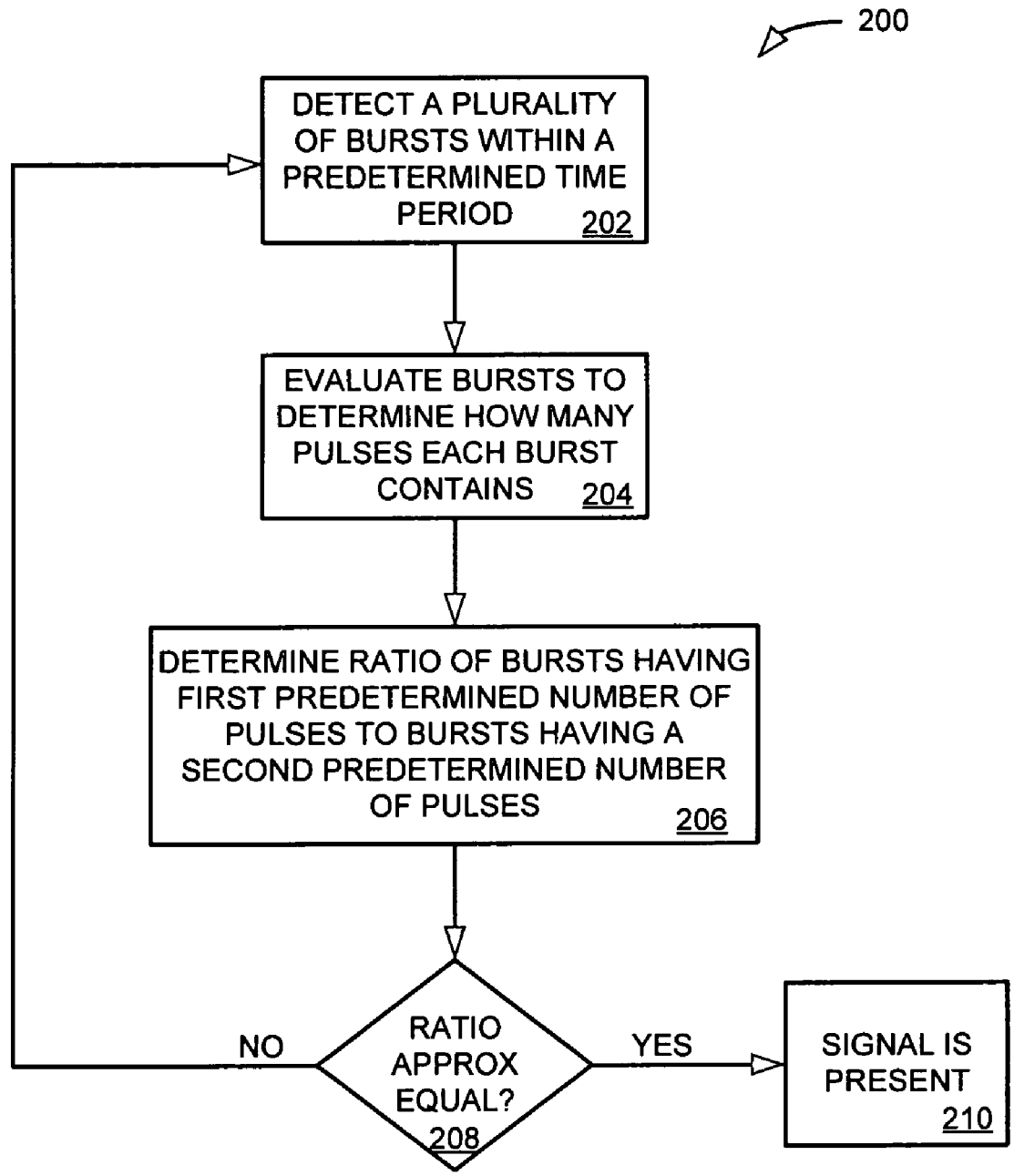
FIG. 2 is a block diagram of a methodology for detecting a signal having random characteristics.
Figure 3:
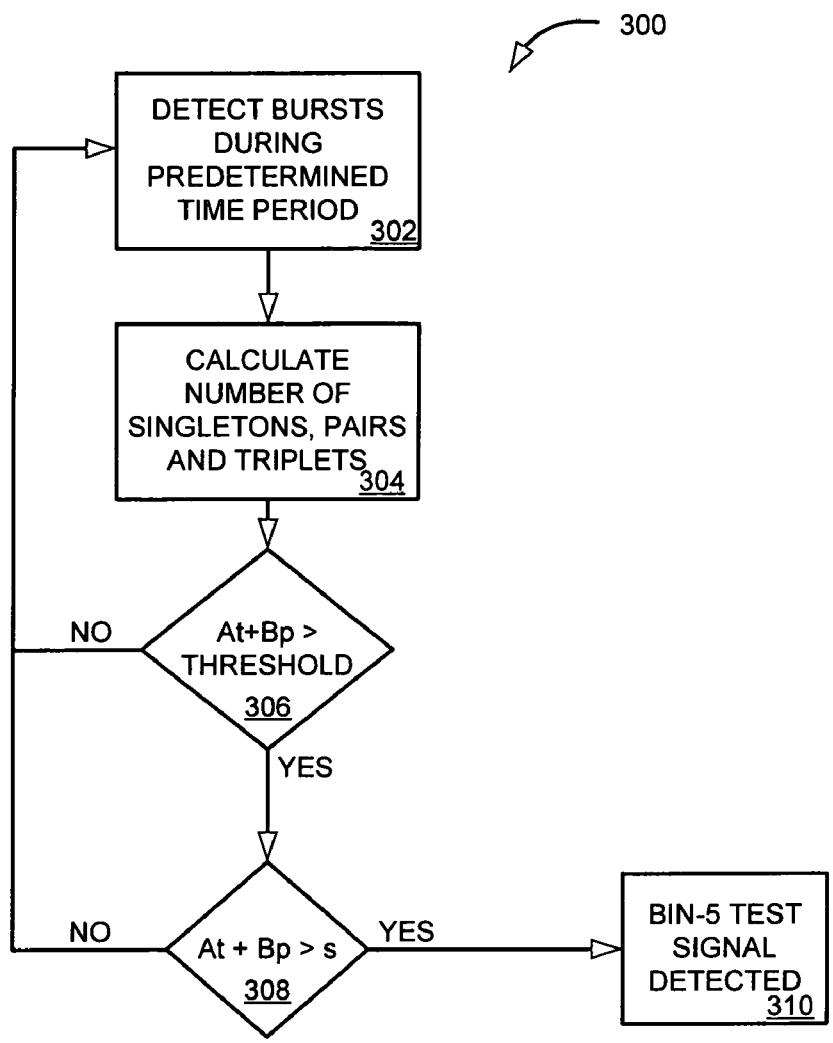
FIG. 3 is a block diagram of a methodology for detecting a Bin-5 Test Signal.

In view of the foregoing features described above, a methodology in accordance with various aspects of the present invention will be better appreciated with reference to FIGS. 2 and 3. While, for purposes of simplicity of explanation, the methodology of FIGS. 2 and 3 are shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect the present invention. Embodiments of the present invention are suitably adapted to implement the methodology in hardware, software, or a combination thereof.

Referring to FIG. 2, there is illustrated a block diagram of a methodology 200 for detecting a signal having random characteristics. At 202, bursts within a predetermined time period are detected. The detected bursts can be limited to bursts having a predetermined signal strength, such as greater than 64 dBm and to bursts that are unidentifiable. By unidentifiable it is meant that the burst is not recognizable as wireless local area network traffic. For example, if the burst can be decoded and is determined to have a header, such as an 802.11 header, the burst is not used. The predetermined period can be a sliding time period, e.g., the last 12 seconds. The sliding time period can be updated as often as desired, for example every one tenth of a second.

At 204, the bursts are evaluated to determine how many pulses each burst contains. A predetermined criterion can be applied to the pulses for evaluation. For example, a Bin-5 Test Signal has pulses with pulse widths of 50 to 100 microseconds, and for bursts containing multiple pulses, the spacing between pulses can vary from 1 to 2 milliseconds (or 1000-2000 microseconds). Bursts that do not have pulses meeting the predetermined criteria can be discarded.

At 206, the ratio of bursts containing a first predetermined number of pulses and bursts having a second predetermined number of pulses is determined. The first and second predetermined number of pulses can be any desired number, for example the first predetermined number can be one and the second predetermined number can be two, for obtaining the ratio of bursts containing a single pulse to bursts containing a pair of pulses.

At 208, the ratio is evaluated to determine whether the number of bursts having the first predetermined number of pulses is approximately equal to the number of bursts having the second predetermined number of pulses. If the ratio indicates that the number of bursts having the first predetermined number of pulses is approximately equal to the number bursts having the second predetermined number of pulses (YES), then as shown at 210 a determination is made that the signal is present. Otherwise, the method 200 continues and evaluates the next time period at 202. The time period can be a sliding time period, wherein the older bursts are dropped out of the calculations as newer bursts are received.

Although as illustrated in FIG. 2 methodology 200 is used to determine the ratio of bursts having first and second predetermined number of pulses, this is merely for ease of illustration as the aspects of the present invention are suitably adaptable to be extrapolated for use with any number of pulses. For example, for detecting a Bin-5 Test Signal, the ratio of bursts containing singletons to pairs to triplets can be obtained at step 206 and the determination of whether the ratios are approximately equal can be used at step 208 to determine whether the Bin-5 Test Signal is present.

FIG. 3 is a block diagram of a methodology 300 for detecting a Bin-5 Test Signal. At 302, bursts within a predetermined time period are detected. The detected bursts can be limited to bursts having a predetermined signal strength, such as greater than 64 dBm and to bursts that are unidentifiable. By unidentifiable it is meant that the burst is not recognizable as wireless local area network traffic. For example, if the burst can be decoded and is determined to have a header, such as an 802.11 header, the burst is not used. The predetermined period can be a sliding time period, e.g., the last 12 seconds. The sliding time period can be updated as often as desired, for example every one tenth of a second. For a Bin-5 Test Signal, the predetermined time period is 12 seconds.

At 304, the bursts are evaluated to determine how many pulses each burst contains. For a Bin-5 Test Signal, the number of bursts containing one pulse (singletons), two pulses (pairs) and three pulses (triplets) are calculated. Furthermore, a predetermined criterion can be applied to the pulses for evaluation. For example, a Bin-5 Test Signal has pulses with pulse widths of 50 to 100 microseconds, and for bursts containing multiple pulses, the spacing between pulses can vary from 1 to 2 milliseconds (or 1000-2000 microseconds). Bursts that do not have pulses meeting the predetermined criteria can be discarded.

At 306, an algorithm is applied to the number of pairs and triplets detected. The number of triplets is multiplied by a first factor, the number of pairs is multiplied by a second factor. A determination is made whether the sum of the product of triplets multiplied by the first factor and the product of pairs multiplied by the second factor is greater than a predetermined threshold. If the sum of the product of triplets multiplied by the first factor and the product of pairs multiplied by the second factor is greater than a predetermined threshold (YES), the test at 308 is also implemented; otherwise (NO), a determination is made the signal is not present and the next time period is evaluated, starting again at 302.

At 308, an algorithm is applied to determine whether there are a sufficient number of triplets and pairs to indicate the signals are from a Bin-5 Test Signal (or from a radar producing signals similar to a Bin-5 Test Signal), not from wireless network traffic. A determination is made whether the sum of the product of triplets multiplied by the first factor and the product of pairs multiplied by the second factor is greater than the number of singletons. If at 308 it is determined that the sum of the product of triplets multiplied by the first factor and the product of pairs multiplied by the second factor is greater than the number of singletons (YES), then it is determined that a Bin-5 Test Signal (or a signal from a radar producing signals similar to a Bin-5 Test Signal) has been detected as illustrated at 310; otherwise (NO), a determination is made the signal is not present and the next time period is evaluated, starting again at 302.

As an example of first and second factors for use in steps 306 and 308, a value of 8 for the first factor, four for the second factor and 10 for the threshold, yielding 8t+4p>10 (where t=number of triplets and p=number of pairs) at 306 has been determined useful in detecting a Bin-5 Test Signal. For 308, 8t+4t>s (where s represents the number of singletons) has been found useful in detecting a Bin-5 Test Signal. Furthermore, the combination of tests applied in 306 and 308 have been found useful in detecting a Bin-5 Test Signal, while suppressing false detection from network traffic to a practical level.

Figure 4:
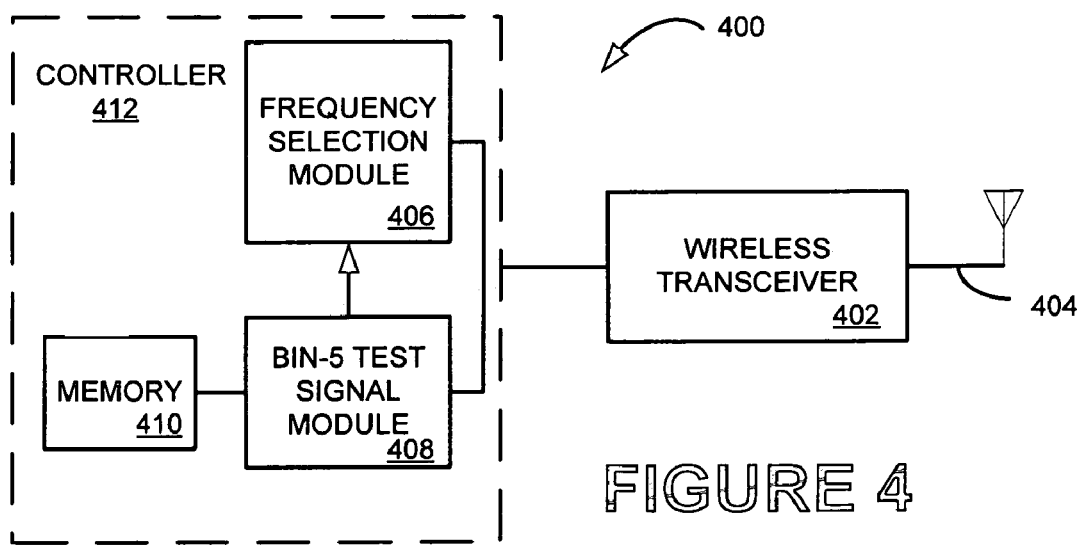
FIG. 4 is a block diagram of a wireless device capable of detecting a signal having random characteristics, such as a Bin-5 Test Signal.

FIG. 4 is a block diagram of a wireless device (apparatus) 400 capable of detecting a signal having random characteristics, such as a Bin-5 Test Signal. Wireless device 400 comprises a wireless transceiver 402 with an antenna 404 that is capable of receiving wireless signals. Bin-5 Test Signal module 408 is communicatively coupled to wireless transceiver 402. Bin-5 test module can receive signals from wireless transceiver 402 to evaluate. Bin-5 test module 408 comprises logic for implementing a methodology for detecting a signal having random characteristics, such as a Bin-5 Test Signal or a radar having similar characteristics. "Logic", as used herein, includes but is not limited to hardware, firmware, software and/or combinations of each to perform a function(s) or an action(s), and/or to cause a function or action from another component. For example, based on a desired application or need, logic may include a software controlled microprocessor, discrete logic such as an application specific integrated circuit (ASIC), a programmable/programmed logic device, memory device containing instructions, or the like, or combinational logic embodied in hardware. Logic may also be fully embodied as software.

Signals that are known to be wireless network signals, or other known signals that are not Bin-5 Test Signals, Radar, etc. can be discarded. Other criteria, for example RSSI can also be applied to signals received by wireless transceiver 402. For example, signals with an RSSI of less than −64 dBm can be ignored if it is desired that Bin-5 Test Signals or radar signals that are farther away can be ignored. Bin-5 Test Signal Module 408 can have an associated Memory 410 for storing data and calculation results. For storing data, memory 410 can be configured to only store the most recent data. Memory 410 can be for example a shift register or ring memory. For a shift register as new values are written in, old values are shifted out and discarded. For a ring memory, newer values overwrite older values.

Bin-5 Test Signal Module 408 is configured to detect a plurality of bursts received by wireless transceiver 402 with a predetermined time period (such as twelve seconds). Bin-5 Test Signal Module 408 evaluates the plurality of bursts to determine the number of pulses each of the plurality of bursts contain. Bin-5 Test Signal Module 408 determines whether a signal having random characteristics is present responsive to the ratio of the number of the plurality of bursts having a first predetermined number of pulses being approximately equal to the number of the plurality of bursts having a second predetermined number of pulses.

In an alternate embodiment, Bin-5 Test Signal Module 408 determines whether a signal having random characteristics is present (such as a Bin-5 Test Signal or a radar with similar signal characteristics) is responsive to the ratio of the plurality of bursts having a first predetermined number of pulses, the plurality of bursts having a second predetermined number of pulses and the plurality of bursts having a third predetermined number of pulses being approximately equal. As an example, the first predetermined number of pulses is one and the second predetermined number of pulses is two and the third predetermined number of pulses is three.

Bin-5 Test Signal Module 408 can be configured for detecting bursts having pulses with a pulse width between 50 to 100 microseconds and spacing between pulses for bursts having more than one pulse is between 1 millisecond and two milliseconds. Furthermore, the number of the plurality of bursts can be between eight and twelve, and the predetermined time period can be twelve seconds.

Bin-5 Test Signal Module 408 can be configured to determine the Bin-5 Test Signal (or radar with Bin-5 Test Signal characteristics) is present responsive to a sum of a product of a first number times the number of bursts containing three pulses and a product of a second number times the number of bursts containing two pulses is greater than a predetermined threshold, and the sum of a product of the first number times the number of bursts containing three pulses and the product of the second number times the number of bursts containing two pulses is greater than a number of the plurality of bursts having single pulses. For example, the first number can be eight, the second number can be four and the predetermined threshold can be ten. Bin-5 Test Signal Module 408 can be configured so that the predetermined time period is the most recent twelve seconds, and is updated every one tenth of a second.

Bin-5 Test Signal Module 408 can be a standalone module (e.g., an ASIC or combinational logic) or can be implemented as part of a processor based controller 412 (for example as software running on a processor). As illustrated in FIG. 4, controller 412 also has a frequency selection module 406 coupled to wireless transceiver 402. Frequency selection module 406 can be used to select operating frequencies for wireless transceiver 402. Bin-5 Test Signal Module 408 is coupled to frequency selection module 406. When Bin-5 Test Signal Module 408 detects a Bin-5 Test Signal, a radar with Bin-5 Test Signal characteristics, or any other random type signal that Bin-5 Test Signal Module 408 is configured to detect, Bin-5 Test Signal Module 408 can communicate with frequency selection module 406 to inform frequency selection module 406 when a signal has been detected. Frequency selection module 406 can be configured to be responsive to receiving the signal from Bin-5 Test Signal Module 408 to change the operating frequency of wireless transceiver 402. This can enable wireless transceiver 402 to avoid using frequencies currently in use by radars. This capability allows wireless transceiver 402 to operate in the 5.250-5.350 GHz or 5.470-5.725 GHz bands in the United States.

FIG. 5 is a block diagram that illustrates a computer system 500 upon which an embodiment of the invention may be implemented. Computer system 500 includes a bus 502 or other communication mechanism for communicating information and a processor 504 coupled with bus 502 for processing information. Computer system 500 also includes a main memory 506, such as random access memory (RAM) or other dynamic storage device coupled to bus 502 for storing information and instructions to be executed by processor 504. Main memory 506 also may be used for storing a temporary variable or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

An aspect of the present invention is related to the use of computer system 100 for detecting a signal having random characteristics such as a Bin-5 Test Signal or a radar signal having Bin-5 Test Signal Characteristics. According to one embodiment of the invention, detecting a signal having random characteristics is provided by computer system 500 in response to processor 504 executing one or more sequences of one or more instructions contained in main memory 506. Such instructions may be read into main memory 506 from another computer-readable medium, such as storage device 510. Execution of the sequence of instructions contained in main memory 506 causes processor 504 to perform the process steps described herein. One or more processors in a multi-processing arrangement may also be employed to execute the sequences of instructions contained in main memory 506. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to non-volatile media, volatile media, and transmission media. Non-volatile media include for example optical or magnetic disks, such as storage device 510. Volatile media include dynamic memory such as main memory 506. Transmission media include coaxial cables, copper wire and fiber optics, including the wires that comprise bus 502. Transmission media can also take the form of acoustic or light waves such as those generated during radio frequency (RF) and infrared (IR) data communications. Common forms of computer-readable media include for example floppy disk, a flexible disk, hard disk, magnetic cards, paper tape, any other physical medium with patterns of holes, a RAM, a PROM, an EPROM, a FLASHPROM, any other memory chip or cartridge, a carrier wave as described hereinafter, or any other medium from which a computer can read.

Computer system 500 also includes a communication interface 518 coupled to bus 502. Communication interface 518 provides a data communication coupling computer system 500 to a wireless transceiver 522.

What has been described above includes exemplary implementations of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims interpreted in accordance with the breadth to which they are fairly, legally and equitably entitled.

What is claimed is:

1. A method for detecting a signal having random characteristics, the steps comprising:
   detecting a plurality of bursts within a predetermined time period;
   evaluating the plurality of bursts to determine how many pulses each of the plurality of bursts contains; and
   determining the signal having random characteristics is present responsive to the plurality of bursts containing a first predetermined number of pulses being approximately equal to the plurality of bursts containing a second predetermined number of pulses.

2. A method according to claim 1 wherein the plurality of bursts have an RSSI greater than −64 dBm.

3. A method according to claim 1, the detecting a plurality of bursts within a predetermined time period detects only bursts that are unidentifiable.

4. A method according to claim 1, wherein the first predetermined number of pulses is one and the second predetermined number of pulses is two.

5. A method according to claim 1, the determining a signal having random characteristics is present further comprises being responsive to the plurality of bursts having a first predetermined number of pulses, the plurality of bursts having a second predetermined number of pulses and the plurality of bursts having a third predetermined number of pulses being approximately equal.

6. A method according to claim 5, wherein the first predetermined number of pulses is one and the second predetermined number of pulses is two and the third predetermined number of pulses is three.

7. A method according to claim 6, the detecting a plurality of bursts within a predetermined time period further comprises
   detecting bursts having pulses with a pulse width between 50 to 100 microseconds and spacing between pulses for bursts having more than one pulse is between 1 millisecond and two milliseconds; and
   wherein the number of the plurality of bursts is between eight and twelve, and the predetermined time period is twelve seconds.

8. A method according to claim 6, further comprising the determining the signal having random characteristics is present responsive to:
   a sum of a product of a first number times the number of bursts containing three pulses and a product of a second number times the number of bursts containing two pulses is greater than a predetermined threshold; and
   the sum of a product of the first number times the number of bursts containing three pulses and the product of the second number times the number of bursts containing two pulses is greater than a number of the plurality of bursts having single pulses.

9. A method according to claim 8, wherein the first number is eight, the second number is four and the predetermined threshold is ten.

10. A method according to claim 8, wherein the predetermined time period is the most recent twelve seconds, and is updated every one tenth of a second.

11. A wireless communications device, comprising:
a wireless transceiver for receiving wireless signals; and
a test signal module communicatively coupled to the wireless transceiver, the test signal module configured to:
detect a plurality of bursts received by the wireless transceiver within a predetermined time period,
evaluate the plurality of bursts to determine the number of pulses each of the plurality of bursts contains, and
determining whether a signal having random characteristics is present responsive to the number of the plurality of bursts having a first predetermined number of pulses being approximately equal to the number of the plurality of bursts having a second predetermined number of pulses.

12. A device according to claim 11, the test signal module is further configured to whether a signal having random characteristics is present responsive to the plurality of bursts having a first predetermined number of pulses, the plurality of bursts having a second predetermined number of pulses and the plurality of bursts having a third predetermined number of pulses being approximately equal.

13. A device according to claim 12, wherein the first predetermined number of pulses is one and the second predetermined number of pulses is two and the third predetermined number of pulses is three.

14. A device according to claim 13, the detecting a plurality of bursts within a predetermined time period further comprises
detecting bursts having pulses with a pulse width between 50 to 100 microseconds and spacing between pulses for bursts having more than one pulse is between 1 millisecond and two milliseconds; and
wherein the number of the plurality of bursts is between eight and twelve, and the predetermined time period is twelve seconds.

15. A device according to claim 14, the test signal module further comprising the determining whether the signal having random characteristics is present responsive to:
a sum of a product of a first number times the number of bursts containing three pulses and a product of a second number times the number of bursts containing two pulses is greater than a predetermined threshold; and
the sum of a product of the first number times the number of bursts containing three pulses and the product of the second number times the number of bursts containing two pulses is greater than a number of the plurality of bursts having single pulses.

16. A device according to claim 15, wherein the first number is eight, the second number is four and the predetermined threshold is ten.

17. A device according to claim 15, wherein the predetermined time period is the most recent twelve seconds, and is updated every one tenth of a second.

18. A computer program product having a computer readable medium having computer program logic recorded thereon for detecting a signal having random characteristics, comprising:
means for detecting a plurality of bursts within a predetermined time period;
means for evaluating the plurality of bursts to determine how many pulses each of the plurality of bursts contains; and
means for determining the signal having random characteristics is present responsive to the plurality of bursts containing a first predetermined number of pulses being approximately equal to the plurality of bursts containing a second predetermined number of pulses.

19. A computer program product according to claim 18, wherein the first predetermined number of pulses is one and the second predetermined number of pulses is two.

20. A computer program product according to claim 18, the means for determining a signal having random characteristics is present further comprises being responsive to the plurality of bursts having a first predetermined number of pulses, the plurality of bursts having a second predetermined number of pulses and the plurality of bursts having a third predetermined number of pulses being approximately equal.

21. A computer program product according to claim 20, wherein the first predetermined number of pulses is one and the second predetermined number of pulses is two and the third predetermined number of pulses is three.

22. A computer program product according to claim 21, the means for detecting a plurality of bursts within a predetermined time period further comprises
means for detecting bursts having pulses with a pulse width between 50 to 100 microseconds and spacing between pulses for bursts having more than one pulse is between 1 millisecond and two milliseconds; and
wherein the number of the plurality of bursts is between eight and twelve, and the predetermined time period is twelve seconds.

23. A computer program product according to claim 21, further comprising the means for determining the signal having random characteristics is present, further comprises
means for producing a sum of a product of a first number times the number of bursts containing three pulses and a product of a second number times the number of bursts containing two pulses which is greater than a predetermined threshold; and
means for producing the sum of a product of the first number times the number of bursts containing three pulses and the product of the second number times the number of bursts containing two pulses which is greater than a number of the plurality of bursts having single pulses.

24. A computer program product according to claim 23, wherein the first number is eight, the second number is four and the predetermined threshold is ten.

* * * * *